United States Patent [19]

Roberts

[11] Patent Number: 5,911,927
[45] Date of Patent: Jun. 15, 1999

[54] METHOD OF PRODUCING ARTIFICIAL ROCKS AND WATERFALLS

[76] Inventor: Thomas J. Roberts, 1702 Campbell St., Sandusky, Ohio 44870

[21] Appl. No.: 08/975,043

[22] Filed: Nov. 20, 1997

[51] Int. Cl.⁶ .............................. B29C 44/06; B29C 44/12
[52] U.S. Cl. ................... 264/46.4; 264/46.6; 264/129; 264/220; 264/255; 264/313
[58] Field of Search ................... 264/220, 46.4, 264/46.6, 129, 255, 313

[56] References Cited

U.S. PATENT DOCUMENTS

| | | |
|---|---|---|
| 3,546,052 | 12/1970 | McNamara . |
| 3,950,477 | 4/1976 | Di Giacomo . |
| 4,082,586 | 4/1978 | Osment .................................. 264/220 |
| 4,385,088 | 5/1983 | Baskin . |
| 4,475,847 | 10/1984 | Cornely et al. . |
| 4,496,511 | 1/1985 | Virgili ..................................... 264/220 |
| 4,656,722 | 4/1987 | Armstrong .............................. 264/220 |
| 4,668,451 | 5/1987 | Langson . |
| 4,847,026 | 7/1989 | Jarboe et al. . |
| 4,940,558 | 7/1990 | Jarboe et al. . |
| 4,960,622 | 10/1990 | Jarboe et al. . |
| 5,443,774 | 8/1995 | Kluh et al. . |
| 5,543,100 | 8/1996 | Kluh et al. . |
| 5,679,189 | 10/1997 | Jarboe .................................... 264/220 |

*Primary Examiner*—Allan R. Kuhns
*Attorney, Agent, or Firm*—Richard C. Litman

[57] ABSTRACT

A method of producing artificial rock formations such as rocks and waterfalls by (a) forming a flexible mold of latex, silicone or urethane from a master model; (b) forming a sectional fiberglass cradle to support the flexible mold; and (c) coating the flexible mold with layers of lacquer, non-foaming polyurethanepolyisocyanate, and foaming polyurethane-polyisocyanate; and (d) demolding and coating the final rock formation product with paint or a stain.

20 Claims, 1 Drawing Sheet

---

STEP 1: PREPARE MASTER MODEL OF A REAL OR ARTIFICIAL ROCK OR A ROCK FORMATION OF A WATERFALL.

STEP 2: PREPARE A FLEXIBLE MOLD OF MASTER MODEL FROM LATEX, SILICONE OR POLYURETHANE BY REPEATED BRUSHING.

STEP 3: PREPARE A MULTIPLE SECTION CRADLE FROM FIBERGLASS MATTING AND POLYESTER RESIN AND BOLT SECTIONS TOGETHER.

STEP 4: REMOVE THE MOLD FROM THE MASTER MODEL AND REMOVE ANY PARTICLES FROM THE INNER MOLD SURFACE.

STEP 5: FIT MOLD INTO CRADLE AND SPRAY LACQUER BARRIER COAT INTO THE MOLD WITH A WET THICKNESS OF 15 MILS.

STEP 6: SPRAY A NON-FOAMING POLYURETHANE POLYOL AND POLYISOCYANATE COMPOSITION AND FORM A 1/2 INCH LIP.

STEP 7: SPRAY A POLYURETHANE-POLYISOCYANATE FOAM MIXTURE TO 2-INCH THICKNESS, DEMOLD AND COAT WITH PAINT OR STAIN.

STEP 1: PREPARE MASTER MODEL OF A REAL OR ARTIFICIAL ROCK OR A ROCK FORMATION OF A WATERFALL.

STEP 2: PREPARE A FLEXIBLE MOLD OF MASTER MODEL FROM LATEX, SILICONE OR POLYURETHANE BY REPEATED BRUSHING.

STEP 3: PREPARE A MULTIPLE SECTION CRADLE FROM FIBERGLASS MATTING AND POLYESTER RESIN AND BOLT SECTIONS TOGETHER.

STEP 4: REMOVE THE MOLD FROM THE MASTER MODEL AND REMOVE ANY PARTICLES FROM THE INNER MOLD SURFACE.

STEP 5: FIT MOLD INTO CRADLE AND SPRAY LACQUER BARRIER COAT INTO THE MOLD WITH A WET THICKNESS OF 15 MILS.

STEP 6: SPRAY A NON-FOAMING POLYURETHANE POLYOL AND POLYISOCYANATE COMPOSITION AND FORM A 1/2 INCH LIP.

STEP 7: SPRAY A POLYURETHANE-POLYISOCYANATE FOAM MIXTURE TO 2-INCH THICKNESS, DEMOLD AND COAT WITH PAINT OR STAIN.

METHOD OF PRODUCING ARTIFICIAL ROCKS AND WATERFALLS

BACKGROUND OF THE INVENTION

1. Field of the Invention

The present invention relates to an improved method of producing artificial rock and waterfalls with a sectioned cradle and with layers of non-foaming and foaming polyurethane.

2. Description of the Related Art

The related art describes a variety of processes for making artificial landscape materials from plastic and rigid materials. The art of interest will be considered in the order of their perceived relevance to the present invention.

U.S. Pat. Nos. 4,847,026, 4,940,558 and 4,960,622 respectively issued on Jul. 11, 1989, Jul. 10, 1990, and Oct. 2, 1990, to Enos D. Jarboe et al. describe methods of molding an artificial urethane rock and the product thereof. A flexible mold is prepared from the application of numerous coats of liquid uncured latex rubber, silicone or urethane upon the rock exterior in combination with an embedded fabric. A supporting cradle for the rubber mold is produced by spraying a low density urethane foam composition over the mold. The mold and cradle are stripped from the rock and sprayed with a heated two-component structural urethane system including an isocyanate and a polyol with catalysts (organo-metal compounds, tertiary amines and alkali metal oxides), unsaturated resins, plasticizers, foaming or blowing agents, coloring agents such as colorants, dispersion dyes and pigments, an anti-oxidation additive, and an ultraviolet adsorber additive. The molded urethane rock is removed from the mold and reinforced with an inner layer of low density urethane foam. There is no concern for forming a cradle from multiple sections, removal of particles from the inner mold surface, forming a lacquer barrier coating in the mold, forming a lip in the non-foaming polyurethane coating, and painting or staining the product.

U.S. Pat. Nos. 5,443,774 and 5,543,100, respectively issued on Aug. 22, 1995 and Aug. 6, 1996, to Gordon Kluh et al. describe methods for making large-scale artificial rocks in a four-step process comprising: (1) forming a silicone rubber model of a rock; (2) coating the back side of the model with either a glass fiber reinforced plastic, hard polyvinyl chloride or polyesters to form a work mold; (3) sequentially coating the back side of the work mold with a parting compound, fiberglass matting, and a synthetic resin to make a positive model; and (4) sequentially coating the outer surface of the positive model with either a synthetic resin, pressure-setting plastic, hard polyvinyl chloride or polyesters, and multi-colored sand. These methods differ from the present invention in failing to form a cradle from multiple sections, spraying a coating of lacquer and coatings of non-foaming and foaming polyurethane.

U.S. Pat. No. 4,668,451 issued on May 26, 1987, to Bruce K. Langson describes a process for making a full life size artificial rock formation from a natural rock formation surface comprising coating the rock with a plurality of coats of latex, holding the latex mask in a fiberglass mold, applying a vacuum to the inner surface of the mask to cause all the cracks and crevices to open up, and applying cement to the outer surface of the mask to fill the open cracks and crevices. The cement coating process is clearly distinguished by the present invention.

U.S. Pat. No. 3,950,477 issued on Apr. 13, 1976, to Philip A. Di Giacomo describes a process for artificially forming rocks by forming a rubber film mold of a natural rock, placing the flexible mold on a bed of flowable polystyrene supporting pellets, and filling the mold cavity with concrete. The use of concrete is not contemplated in the present invention.

U.S. Pat. No. 4,475,847 issued on Oct. 9, 1984, to Wolfgang Cornely et al. describes a process and a cartridge product used in the process for consolidation and sealing of geological formations and artificial beds of rock, earth, and coal by injecting the blends of foaming and hardening polyisocyanate and polyol blends from a two-chamber cartridge into boreholes or injection pipes in the geological formations. Various foaming agents and catalysts are described.

U.S. Pat. No. 4,385,088 issued on May 24, 1983, to David Baskin describes a set of decorative artificial rocks from a rectangular block of styrofoam which are hand sculptured (or injection molded) in the form of rocks wherein a smaller rock nests inside the other rock. The outside surface of the rocks are coated with up to a six-inch thick wall of epoxy resin, sand and pigment to simulate natural rocks. There is little similarity between this process and that of the present invention.

U.S. Pat. No. 3,546,052 issued on Dec. 8, 1970, to Julie H. McNamara describes artificial rocks having flexible but inelastic polypropylene shells which can be filled by the purchaser at home with air, sand, gravel or soil. Other plastic materials are fluorinated polypropylene, copolymers of fluorinated ethylene and polypropylene, and vinyl plastisol. The shell can be made by blow molding or centrifugal casting. The shell can be painted and coated with rock particles. The fabrication process is clearly distinguished by the present invention.

The specific urethane forming components, the various additives, and the coating process parameters described by the above patents are hereby incorporated by reference.

None of the above inventions and patents, taken either singularly or in combination, is seen to describe the instant invention as claimed. Thus, a method of producing artificial rocks and waterfalls solving the aforementioned problems is desired.

SUMMARY OF THE INVENTION

The instant invention is a method of producing artificial rock formations including rocks and waterfalls, by forming a flexible mold of latex, silicone or urethane from a master model, and then forming a sectional fiberglass cradle to support the flexible mold, and then coating the flexible mold with layers of lacquer, non-foaming polyurethane-polyisocyanate, and foaming polyurethanepolyisocyanate; and finally demolding and coating the final rock formation product with paint or a stain.

Accordingly, it is a principal object of the invention to provide a method of fabricating artificial rocks.

It is another object of the invention to provide a method of fabricating artificial waterfalls.

It is a further object of the invention to provide a method of fabricating rock formations utilizing a multiple section cradle.

Still another object of the invention is to provide a method of fabricating rock formations from separate but contiguous coats of non-foaming and foaming polyurethane-polyisocyanate copolymer compositions.

It is an object of the invention to provide improved elements and arrangements thereof in a method of producing artificial rocks and waterfalls for the purposes described which is inexpensive, dependable and fully effective in accomplishing its intended purposes.

These and other objects of the present invention will become readily apparent upon further review of the following specification and drawing.

BRIEF DESCRIPTION OF THE DRAWING

The FIGURE is a schematic presentation of a method of producing artificial rocks and waterfalls according to the present invention.

DETAILED DESCRIPTION OF THE PREFERRED EMBODIMENTS

The present invention provides a method for fabricating artificial rock and waterfall formations by the following steps shown schematically in the FIGURE: (1) forming a master model of a model; (2) forming a flexible mold of the master model; (3) forming a multiple section cradle to support the flexible mold; (4) removing and cleaning the mold from the master model; (5) fitting the mold with the cradle and coating with lacquer; (5) forming a non-foaming urethane coating; (6) forming a foaming urethane coating; and (7) demold and coat with either colored paints or stains.

Step 1. A master model is produced from either real rock formations, artificial rock formations, clay or plaster models or combinations thereof. Waterfalls require waterflow considerations such as a small water pump and an internal pipe system for feeding, collecting and recycling the water. The master model is cleaned of any loose particles and a mold release composition such as Omniwax 1622 (TM) is applied.

Step 2. A flexible mold of the master model is made from either latex, silicone or urethane. Latex is preferred and applied by brushing on multiple coats of latex. Each wet coat is approximately 150 mils thick. Recoating can be done in 1–8 hours up to a maximum of 36 hours. 20–35 coats which total a dry thickness of approximately 0.25 inch are applied. Air bubbles and thick areas in the wet coating are removed. No reinforcing materials are permitted because the integrity of the mold would be compromised.

Step 3. A cradle of fiberglass matting and polyester resin is made and designed to accurately support the mold once it is removed from the master model. Cardboard sections 5 inches high and 1/16 inch thick are mounted perpendicular to the mold. A coating of a fiberglass release product such as a polyvinyl acetate is applied overall. The fiberglass-resin coating is applied preferably by hand. The cradle is sectioned with integral 0.5 inch wide flanges and attached together by 0.5 inch long bolts and wing nuts through holes in the flanges. A large cradle can be fitted with a wooden framework on ball-bearing wheels for movement between coating areas.

Step 4. The mold is removed from the master model and cleaned of any particles from the inner mold surface which is the rock textured side.

Step 5. The mold is fitted into the cradle to expose the rock textured surface and covered with a white vinyl lacquer barrier coat to a wet thickness of approximately 15 mils. This sprayed on coating provides a base for the finishing color coating and ultraviolet protection for exterior use of the rock formation product. The lacquer coating acts as a mold release coating and becomes the first visible surface on the finished product.

Step 6. The mold is coated with a non-foaming urethane composition by spraying a two-part system of a polyurethane polyol and a polyisocyanate in an equal volume ratio to a thickness of approximately 1/16 inch which is free of seams and pinholes. For a waterfall product, the polyvinylchloride pipe for distributing the water is now mounted on the mold by spraying a 0.5 inch lip layer around the pipe.

Step 7. Another 2 inch layer of a foaming urethane composition comprising of a polyurethane polyol and a diusocyanate in an equal volume mixture is applied in a urethane foam density range of 2–20 lb. with 2.7 lb. preferred. The product can be demolded after a 5 minute wait and trimmed with a fine-toothed saw. On waterfall units, a hole correlating with the water pipe is made. The product is preferably coated with a paint composed of natural colored oxides and sodium silicate suspended in xylene. The critical temperature of painting is above 65° F. in order to correctly bond to the barrier coat. Superior color retention and ultraviolet protection is obtained by these paint compositions. Alternatively, commercially available paints and stains can be utilized. Finally, additional ultraviolet protection can be achieved by using a clear vinyl lacquer coat finish over the painted or stained surface.

Thus, a method of forming artificial geologic formations is shown which are decorative and durable whether exposed to the elements outside or exhibited inside a building.

It is to be understood that the present invention is not limited to the embodiments described above, but encompasses any and all embodiments within the scope of the following claims.

I claim:

1. A method of producing an artificial rock formation comprising:

preparing a master model of a real or artificial rock formation;

preparing a flexible mold of the master model from a thermosetting composition selected from the group consisting of a latex, a silicone and a polyurethane;

preparing a cradle from multiple sections of a composite of fiberglass matting and polyester resin which are bolted together;

removing the flexible mold from the master model and fitting the flexible mold into the cradle;

coating the flexible mold with lacquer;

coating the lacquered mold with a non-foaming polyurethane polyol and polyisocyanate composition;

coating the lacquered mold with a foaming polyurethane polyol and polyisocyanate composition to form a molded product; and demolding the molded product comprising the lacquer and the non-foaming and foaming compositions, and coating the molded product with a material selected from the group consisting of a paint and a stain.

2. The method according to claim 1, wherein the artificial rock formation is selected from the group consisting of a clay model, a plaster model and mixtures thereof.

3. The method according to claim 1, wherein the flexible mold is latex.

4. The method of producing artificial rocks.and waterfalls according to claim 1, wherein the flexible mold is silicone.

5. The method according to claim 1, wherein the flexible mold is polyurethane.

6. The method according to claim 1 wherein, in the step of preparing the cradle, further coating a layer of polyvinyl acetate inside the flexible mold as a fiberglass releasing agent.

7. The method according to claim 1 wherein, in the step of preparing the cradle, further forming the sections by installing cardboard walls before the fiberglass matting and polyester resin composite is formed.

8. The method according to claim 1 wherein, in the step of preparing the cradle, further installing a wooden framework with ball-bearing wheels for movement of the cradle between coating areas.

9. The method according to claim 1 wherein, in the step of fitting the flexible mold into the cradle, cleaning the flexible mold of any loose particles, and after the step of coating the lacquered mold with a non-foaming polyurethane polyol and polyisocyanate composition, inserting a polyvinyl pipe for distributing water for a waterfall.

10. The method according to claim 1, including coating the flexible mold with a white vinyl lacquer barrier coat to a wet thickness of 15 mils.

11. The method according to claim 1 wherein, in the step of coating the lacquered mold with a non-forming polyurethane polyol and polyisocyanate composition, the combining volume proportions are equal, and the non-forming composition is applied to result in a thickness of 1/16 inch.

12. The method according to claim 1, including the addition of a polyvinylchloride pipe to the flexible mold during the coating of the non-foaming urethane.

13. The method according to claim 1, wherein the foaming urethane composition is applied to result in a urethane foam density range of 2 to 20 lbs.

14. The method according to claim 13, wherein the foaming urethane composition is applied to result in a urethane foam density of 2.7 lbs.

15. The method according to claim 1 wherein, after the demolding step, trimming the molded product with a fine-toothed saw.

16. The method according to claim 1, including the painting of the molded product with a composition comprising natural colored oxides and sodium silicate suspended in xylene.

17. The method according to claim 1, including the painting of the molded product above 65° F. to obtain a secure bond to the underlying coating.

18. The method according to claim 17, including the painting of the molded product with a colored stain.

19. The method according to claim 17, including the painting of the molded product with a composition comprising natural colored oxides and sodium silicate suspended in xylene.

20. The method o producing artificial rocks and waterfalls according to claim 1, including the further coating of the coated product with a clear vinyl lacquer finish.

* * * * *